(No Model.)  7 Sheets—Sheet 1.

J. F. APPLEBY.
COMBINED HARVESTER AND BINDER.

No. 336,075.  Patented Feb. 16, 1886.

Witnesses:
M. L. Adams
R. C. Howel

Inventor:
John F. Appleby,
Per Edw. E. Quimby,
Atty.

(No Model.)  7 Sheets—Sheet 5.
J. F. APPLEBY.
COMBINED HARVESTER AND BINDER.

No. 336,075. Patented Feb. 16, 1886.

Witnesses:
M. L. Adams.
R. C. Howes.

Inventor.
John F. Appleby,
Per Edw. E. Quimby,
Atty.

(No Model.) 7 Sheets—Sheet 6.
J. F. APPLEBY.
COMBINED HARVESTER AND BINDER.
No. 336,075. Patented Feb. 16, 1886.
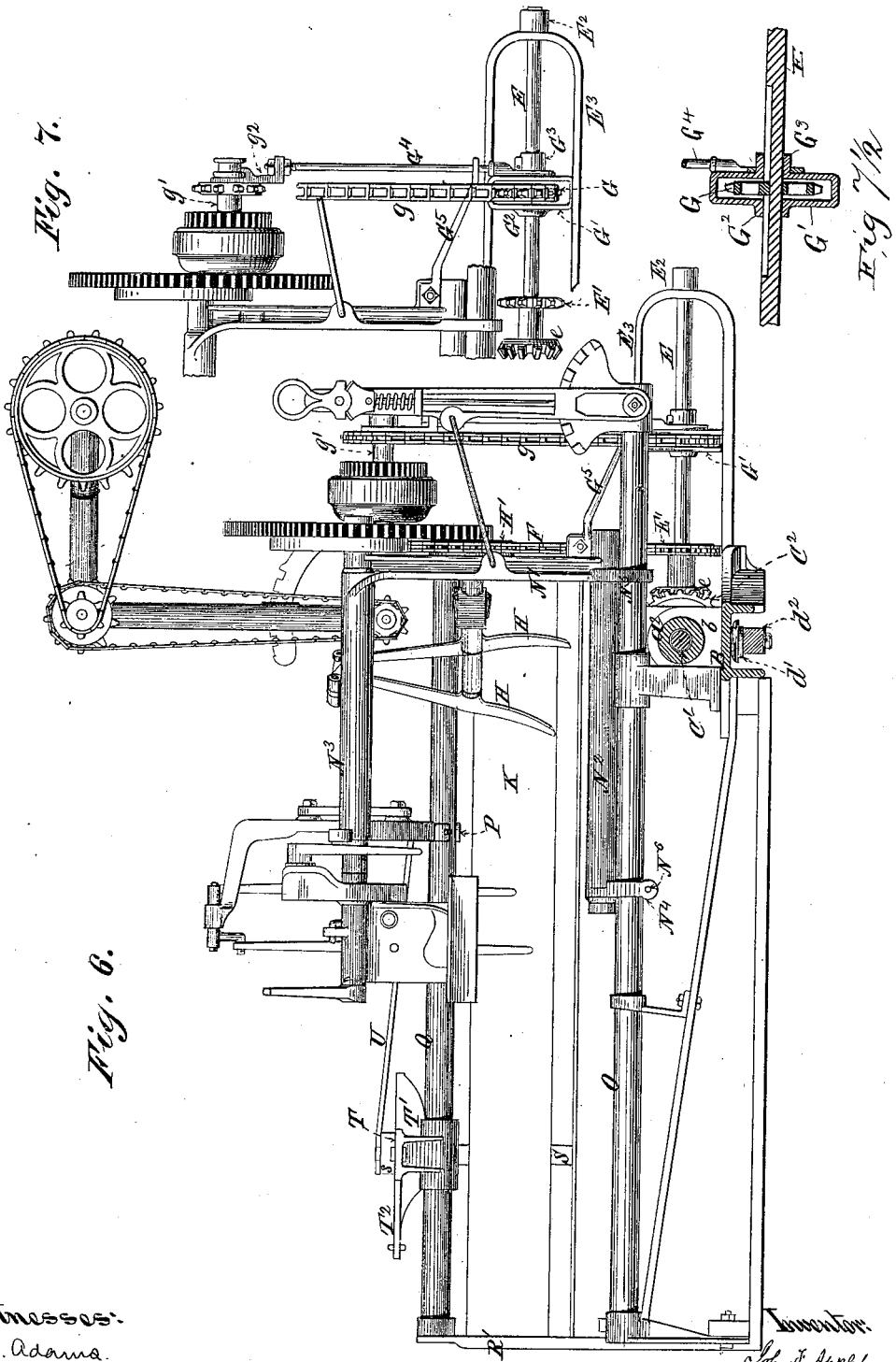

(No Model.) 7 Sheets—Sheet 7.
J. F. APPLEBY.
COMBINED HARVESTER AND BINDER.
No. 336,075. Patented Feb. 16, 1886.
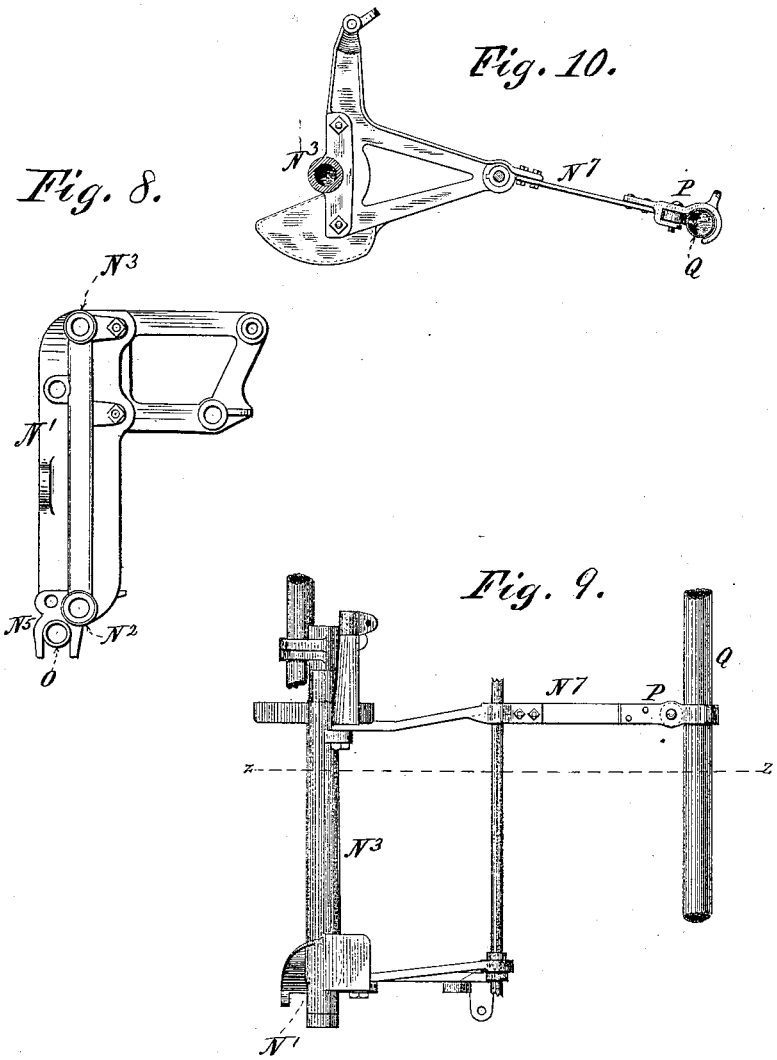

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

COMBINED HARVESTER AND BINDER.

SPECIFICATION forming part of Letters Patent No. 336,075, dated February 16, 1886.

Application filed December 10, 1884. Serial No. 149,926. (No model.)

*To all whom it may concern:*

Be it known that I, JOHN F. APPLEBY, of Minneapolis, Minnesota, have invented certain Improvements in a Combined Harvester and Binder, of which the following is a specification.

My improvements in combined harvesters and binders embrace the following features: first, the means for transmitting power from the counter-shaft, which is rotated by the gear on the drive-wheel, and which may be considered the prime shaft of the combined machine, which consists in a vertical shaft for reciprocating the sickle, provided with a pinion engaging the bevel-wheel on the inner end of the said prime shaft, and in a horizontal shaft for driving the other parts of the machine, provided with a pinion, also engaging the bevel-wheel on the inner end of the said prime shaft; secondly, in the connection of the adjustable back board with the binder-frame, so that the act of adjusting the binder-frame adjusts the back board; and, thirdly, in the organization of the mechanism which supports the back board, and the connection of such mechanism with the binder-frame, whereby the back board when being automatically adjusted by the movement of the binder-frame is made to move faster than the binder-frame, and thus to have a range of movement which is greater than that of the binder-frame.

The accompanying drawings represent my improvements applied in a combined harvester and binder of the so-called "low-down" type, in which the binding apparatus is arranged on the grain side of the drive-wheel, and is supported upon the bed-plate, which joins and forms a part of the platform-frame.

Figure 1:
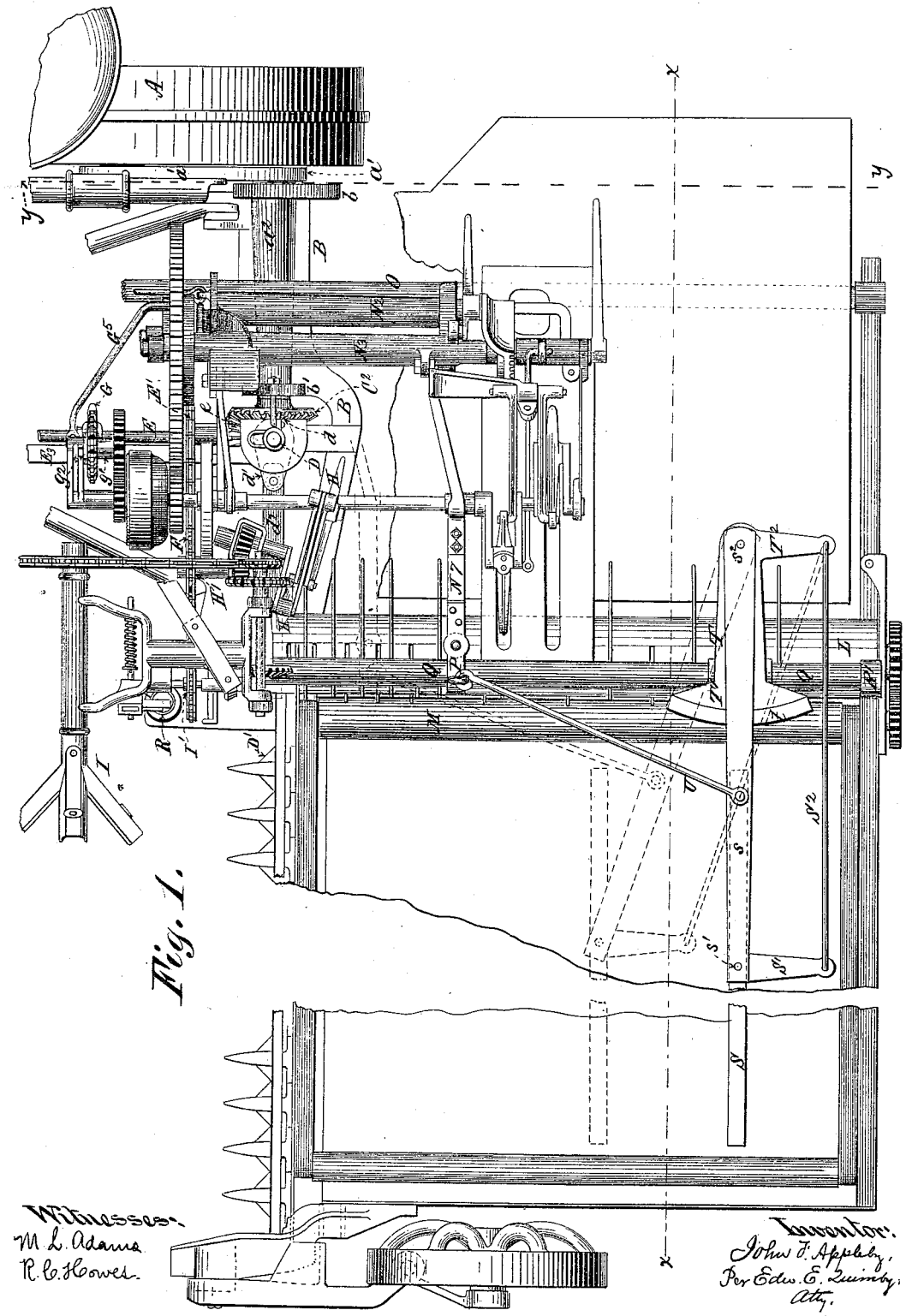
Figure 2:
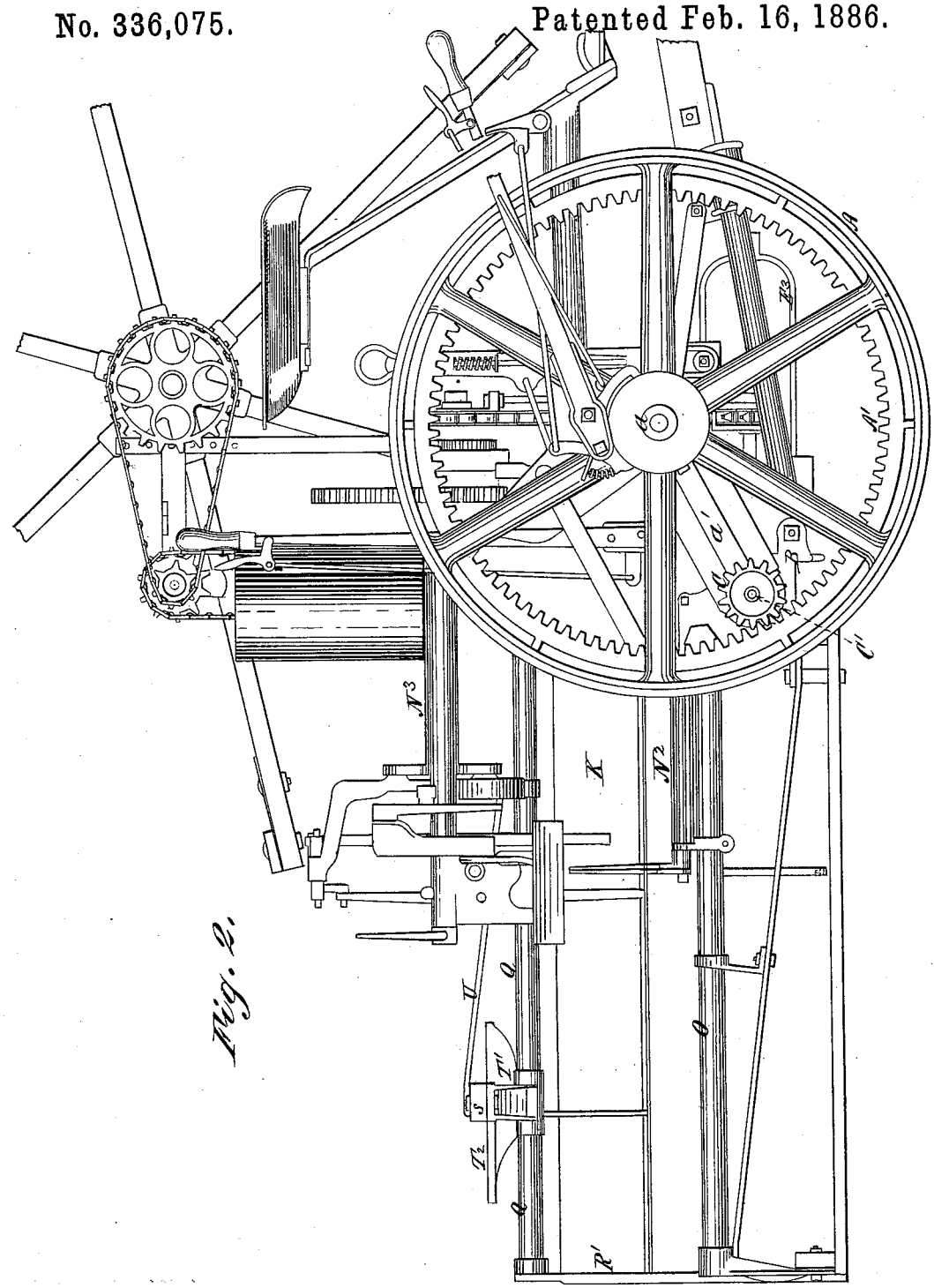
Figure 3:
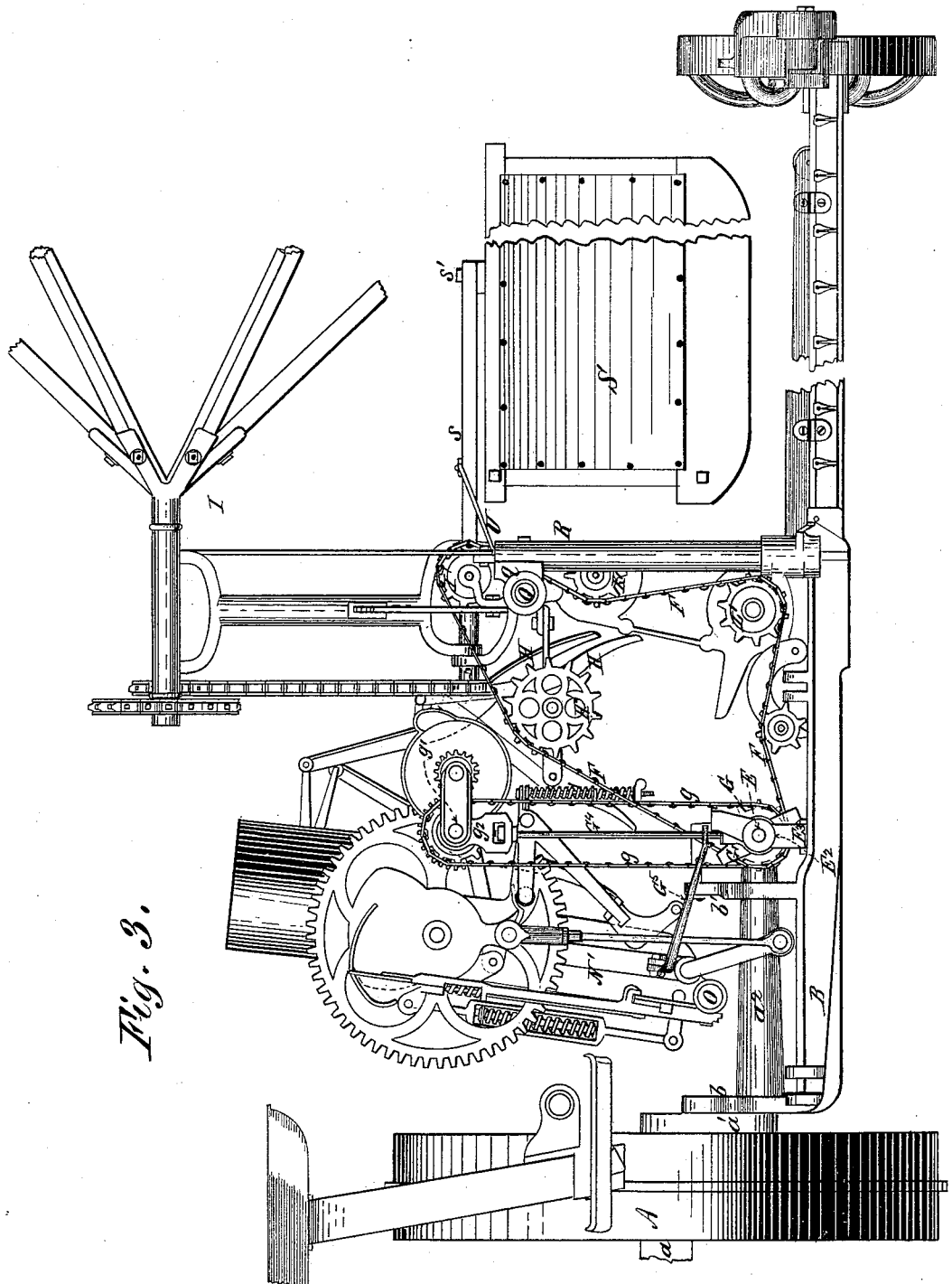
Figure 4:
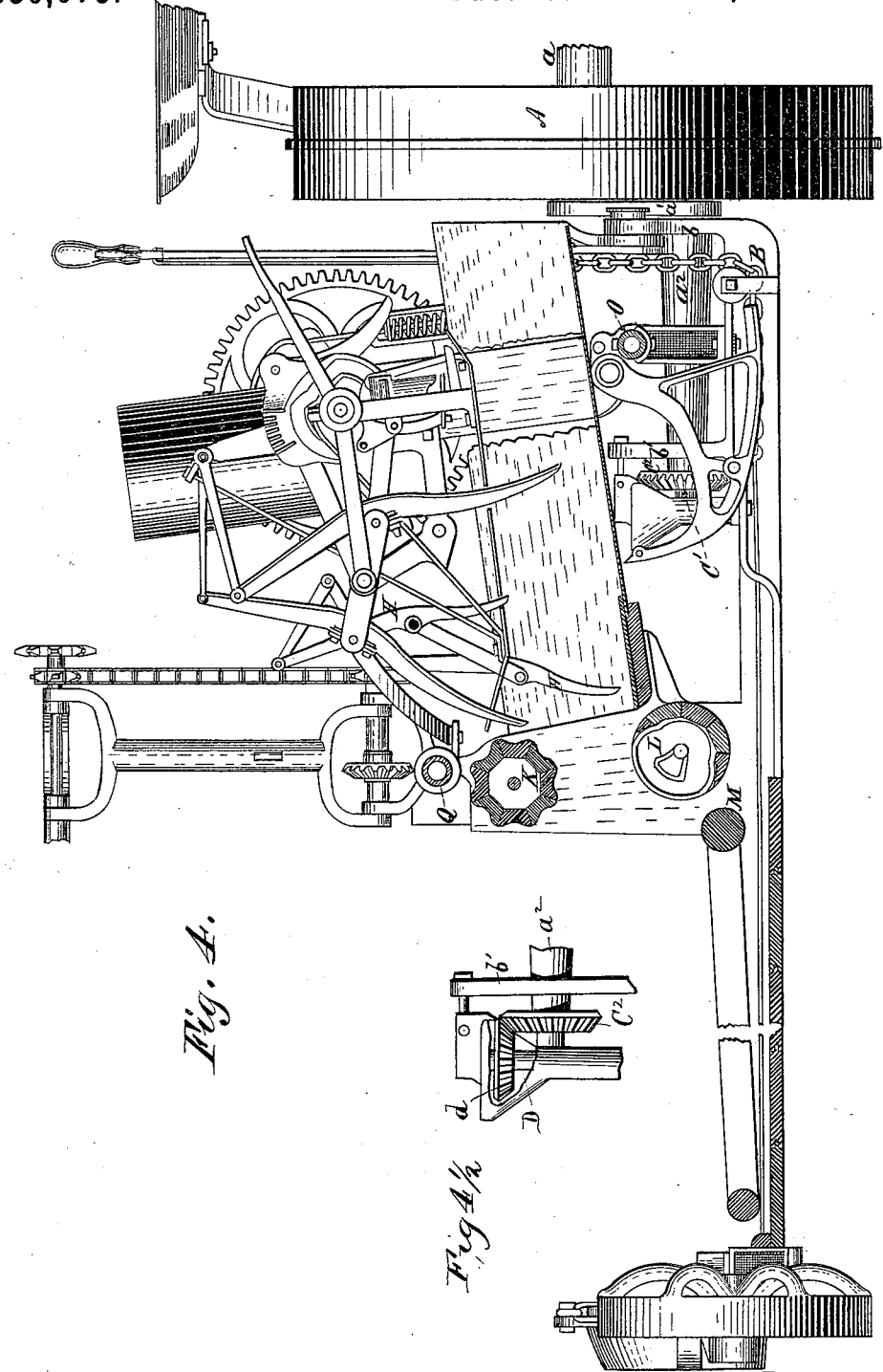
Figure 5:
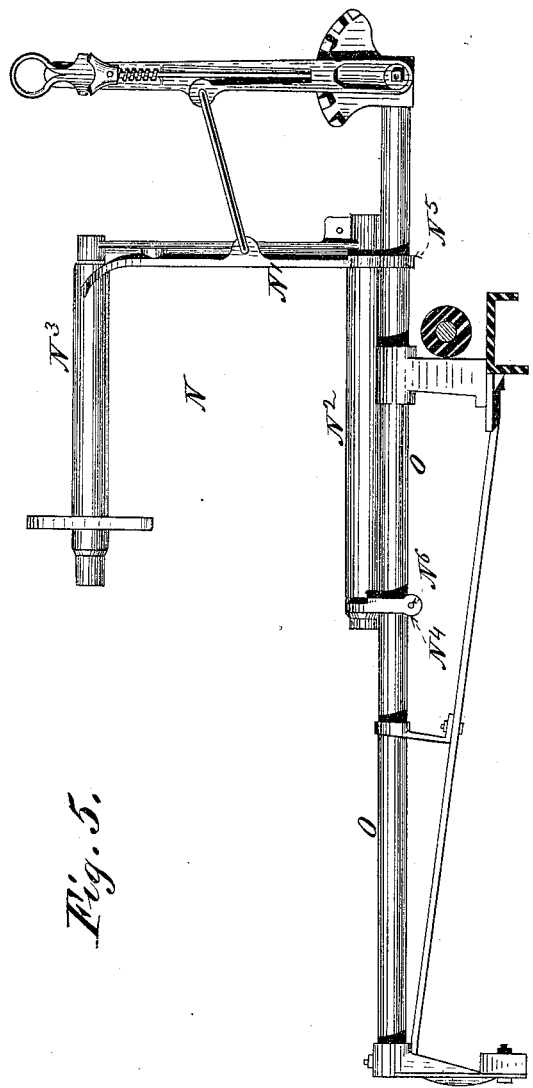

Figure 1 is a top view. Fig. 2 is an elevation of the stubble side of the machine. Fig. 3 is a front elevation of the machine with the pole removed. Fig. 4 is a vertical section through the line $x\,x$ on Fig. 1, in which the binding mechanism appears in rear elevation. Fig. 4½ is a detail view showing bevel-pinion at upper end of shaft D. Fig. 5 is an elevation of the metallic binder-frame, showing the portion of the platform-frame upon which the binder-frame slides, and the lever for adjusting the binder-frame. Fig. 6 is a transverse vertical section taken through the line $y\,y$ on Fig. 1, showing in elevation the stubble side of the binder. Fig. 7 is an elevation, partly in section, of a portion of the binder, showing the sprocket-wheel for driving the chain which actuates the binder, and showing the construction whereby the said sprocket-wheel is made to slide upon its shaft to partake of the adjusting movement of the binder-frame. Fig. 7½ is a detail in section of the frame G' and sprocket G. Fig. 8 is a front elevation of the upright member of the binder-frame. Fig. 9 is a top view of the binder-frame; and Fig. 10 is a vertical section of the binder-frame, taken through the line $z\,z$ on Fig. 9.

In the machine represented in the drawings the drive-wheel A is provided with an axle, $a$, to which is affixed the crank-arm $a'$, provided with the hollow crank-pin or sleeve, $a^2$, which is seated in suitable bearings formed in the standards $b\,b'$, which are cast upon or otherwise connected to the bed-plate B. The inside gear, A', of the drive-wheel engages a pinion, C, on the inner end of the horizontal shaft C', which is inserted through the hollow crank-pin or sleeve $a'$, and which, for convenience, I call the "prime shaft" of the machine. Upon one end the prime shaft is provided with a bevel-wheel, $C^2$, which engages the bevel-pinion $d$ upon the upper end of the vertical shaft D, provided upon its lower end with the crank $d'$, connected by means of the pitman $d^2$ with the usual endwise reciprocating sickle-bar, D'. The bevel-wheel $C^2$ also engages the bevel-wheel $e$ upon the rear end of the horizontal shaft E, to which is affixed the sprocket-wheel E', for driving the sprocket-chain F. The forward end of the horizontal shaft E has its bearings in the perforated boss $E^2$, formed upon the bight of the elongated U-shaped frame $E^3$, affixed to and projecting forward from the platform. Another sprocket-wheel, G, is loosely splined upon the horizontal shaft E, so that it may be moved to and fro thereon, and is employed to drive the sprocket-chain $g$, which actuates the prime shaft $g'$ of the binding apparatus. The sprocket-wheel G is confined between the vertical sides of the frame G', which is provided with the perforated bosses $G^2\,G^3$, adapting it to be supported by and slide freely on the shaft E. A vertical rod, $G^4$, connects the frame G' with the box $g^2$, affording the bearing for the forward end of the prime shaft $g'$ of the binder. An arm, $G^5$, connects the vertical rod $G^4$ with the binder-frame, and thus compels the frame $G'$ and the sprocket-wheel G to partake of the horizontal movement of the binder-frame when the latter is being adjusted. The sprocket-chain F drives the butt-rakes H H by engaging the sprocket-wheel H', and drives the reel I by engaging the sprocket-wheel I', and the upper feed-roller, K, by engaging the sprocket-wheel K', and the lower feed-roller, L, by engaging the sprocket-wheel L', the rear end of the shaft of which is geared to and drives the platform carrier-roller M. It will thus be seen that power is transmitted from the prime shaft C' in two separate paths—to wit, through the vertical shaft D for operating the sickle-bar, and through the horizontal shaft E for driving the other mechanisms of the machine.

The employment of a separate shaft for transmitting the power derived from the prime shaft C' to the sickle bar greatly diminishes the strain upon the horizontal shaft E, through which power is transmitted to drive the other mechanisms of the machine. This is an important consideration, because of the necessarily-small size of the bevel-pinion upon the rear end of the horizontal shaft E, which engages and is driven by the bevel-wheel $C^2$ on the inner end of the prime shaft C'.

The binding mechanism is mounted upon a metallic frame, N, which is adapted to slide back and forth upon the horizontal tubular member O of the platform-frame. The binder-frame embraces in a casting the standard N', the lower horizontal tubular bar, $N^2$, and the upper horizontal tubular bar, $N^3$. The lower horizontal tubular bar, $N^2$, affords the bearing for the shaft of the binder-arm, and the upper horizontal tubular bar, $N^3$, the bearing for the shaft of the main gear of the binder. Additional bearings are afforded for the packer-shafts in a suitable metallic frame-work, bolted to the standard N' and to the upper horizontal tubular bar, $N^3$. The lower tubular bar, $N^2$, is provided at its opposite ends with the downwardly-projecting notched lugs $N^4$ and $N^5$, which embrace the horizontal tubular member O in the main frame. The bifurcated lower ends of the lug $N^4$ at the rear end of the tubular bar $N^2$ are perforated to receive the transverse pin $N^6$, which extends across under the member O of the main frame and serves to hold the rear end of the binder-frame down. The necessary lateral support for the upper part of the binder-frame is afforded by the laterally-projecting brace-arm $N^7$, the grain end of which is secured to the strap or socket P, which loosely embraces and slides upon the horizontal member Q of the main frame. The front end of the tubular bar Q is secured in the socket $q$, bolted to the upper part of the standard R, and the rear end of the bar Q is secured to the standard R', the standards R and R' being both secured at their lower ends to the platform-frame. The back board, S, is suspended over the rear part of the platform from the free end of the horizontal lever $s$ by means of the vertical pivot $s'$. The fixed end of the horizontal lever $s$ is pivotally connected by the bolt $s^2$ with the supporting-plate T, projecting laterally from the stubble side of the socket T', which is securely bolted to the horizontal member Q of the main frame. A track, $t$, is cast upon the grain side of the socket T', and presents a horizontal bearing, upon which the lever $s$ slides when swaying upon its vertical axis the bolt $s^2$. The plate T is provided with the rearward extension, $T^2$. A horizontal arm, S', is affixed to and projects rearwardly from the upper part of the back board, and at its rear end is perforated to receive the grain end of the parallel link $S^2$, the opposite end of which is linked to the rearward extension, $T^2$, of the plate T. The length of the parallel link $S^2$ is the same as the distance between the bolt $s^2$, which serves as the axis for the lever $s$, and the pivot $s'$, by means of which the back board is suspended upon the lever $s$. It hence follows that the swaying of the lever $s$ backward and forward moves the back board bodily without altering its parallelism with the finger-bar. The movement of the lever $s$ backward and forward is effected by means of the connecting-rod U, pivoted at its rear end to the lever $s$ and at its forward end to the socket P, which slides on the bar Q. It will be seen that the jointed connection of the connecting-rod U with the lever $s$ is nearly midway between the vertical axis of the lever and its pivotal connection with the back board, and that the range of movement of the back board is therefore nearly twice the range of movement of the binder-frame.

I claim as my invention—

1. The combination, as herein set forth, of the prime shaft C', provided with the bevel-wheel $C^2$, the vertical shaft D, provided with the bevel-wheel $d$, driven by the bevel-wheel $C^2$, and provided with a crank connected by means of a pitman with the sickle-bar, and the horizontal counter-shaft E, provided with the bevel-pinion $e$, likewise engaging the bevel-wheel $C^2$, for transmitting from the prime shaft the power to drive the binding apparatus of the machine.

2. The adjustable vertical back board, S, provided with the horizontally-projecting arm S', and suspended over the rear part of the platform by means of the vertical pivot $s'$, from the free end of the horizontal supporting and adjusting lever $s$, and means for swaying the said lever $s$ upon its fixed axis $s^2$, in combination with the parallel link $S^2$, having a fixed axis at one end, and having its other end linked to the arm S', for the purpose of preserving the parallelism of the said back board with the finger-bar, as shown and described.

3. An adjustable binder-frame and means for adjusting the same, and a back board supported independently of the binder-frame, in combination with a suitable pitman connecting the said back board with the said binder-frame.

4. An adjustable vertical back board suspended by means of a vertical pivot from the free end of a horizontally-swaying supporting and adjusting lever, and means, substantially such as described, for preserving the parallelism of the said back board with the finger-bar, in combination with an adjustable binder-frame, and a pitman connecting the said binder-frame with a part of the adjusting and supporting lever between its fixed axis and its connection with the back board, for the purpose of causing the back board when the binder-frame is adjusted to move faster than the binder-frame, and thereby possess a greater range of adjusting movement.

JOHN F. APPLEBY.

Witnesses:
C. M. CASTLE,
HENRY HONKOMP.